United States Patent
Gao et al.

(10) Patent No.: US 10,442,241 B2
(45) Date of Patent: Oct. 15, 2019

(54) METHODS AND APPARATUS TO PRODUCE HIGH PERFORMANCE AXISYMMETRIC COMPONENTS

(71) Applicant: GM GLOBAL TECHNOLOGY OPERATIONS LLC, Detroit, MI (US)

(72) Inventors: Lei Gao, Shanghai (CN); Bin Hu, Shanghai (CN); Jianfeng Wang, Jiangsu (CN); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 744 days.

(21) Appl. No.: 14/916,858

(22) PCT Filed: Sep. 5, 2013

(86) PCT No.: PCT/CN2013/082994
§ 371 (c)(1),
(2) Date: Mar. 4, 2016

(87) PCT Pub. No.: WO2015/032051
PCT Pub. Date: Mar. 12, 2015

(65) Prior Publication Data
US 2016/0214429 A1    Jul. 28, 2016

(51) Int. Cl.
| | |
|---|---|
| *B60B 1/08* | (2006.01) |
| *B22D 17/00* | (2006.01) |
| *C22C 21/02* | (2006.01) |
| *B22D 21/00* | (2006.01) |
| *B21J 5/00* | (2006.01) |
| *C22F 1/043* | (2006.01) |
| *B21K 1/38* | (2006.01) |
| *B21K 1/28* | (2006.01) |
| *C21D 9/00* | (2006.01) |
| *B60B 3/02* | (2006.01) |

(52) U.S. Cl.
CPC ................. *B60B 1/08* (2013.01); *B21J 5/004* (2013.01); *B21K 1/28* (2013.01); *B21K 1/38* (2013.01); *B22D 17/00* (2013.01); *B22D 21/007* (2013.01); *C21D 9/0068* (2013.01); *C22C 21/02* (2013.01); *C22F 1/043* (2013.01); *B60B 3/02* (2013.01); *B60B 2310/202* (2013.01); *B60B 2310/204* (2013.01); *B60B 2310/208* (2013.01); *B60B 2310/228* (2013.01); *B60B 2310/54* (2013.01)

(58) Field of Classification Search
CPC ........ B22D 21/007; B22D 17/00; B21J 5/004; C22F 1/043; C22C 21/02; C22C 2001/1073; B21K 1/38; B21K 1/28; B60B 1/08; B60B 3/02; B60B 2310/202; B60B 2310/204; B60B 2310/228; B60B 2310/208; B60B 2310/54; C21D 9/0068
See application file for complete search history.

(56) References Cited

U.S. PATENT DOCUMENTS

| | | | | |
|---|---|---|---|---|
| 5,772,801 A | * | 6/1998 | Baldi | ..................... B21D 22/16 148/437 |
| 2003/0155049 A1 | * | 8/2003 | Bergsma | .............. B22D 17/007 148/549 |

FOREIGN PATENT DOCUMENTS

| | | |
|---|---|---|
| CN | 101376937 A | 3/2009 |
| CN | 101450439 A | 6/2009 |
| CN | 101579818 A | 11/2009 |
| DE | 199 15 238 A1 | 10/2000 |
| DE | 101 30 450 A1 | 1/2003 |

* cited by examiner

*Primary Examiner* — Daniel C. McCracken
(74) *Attorney, Agent, or Firm* — Cantor Colburn LLP

(57) ABSTRACT

A material and method for manufacturing components. The method includes squeeze casting the material into a component of a desired shape and flow-forming the component that has been squeeze cast to refine the shape of the component. The method also includes heat treating the component to enhance the microstructure of the component and machining the component to further refine the shape.

10 Claims, 5 Drawing Sheets

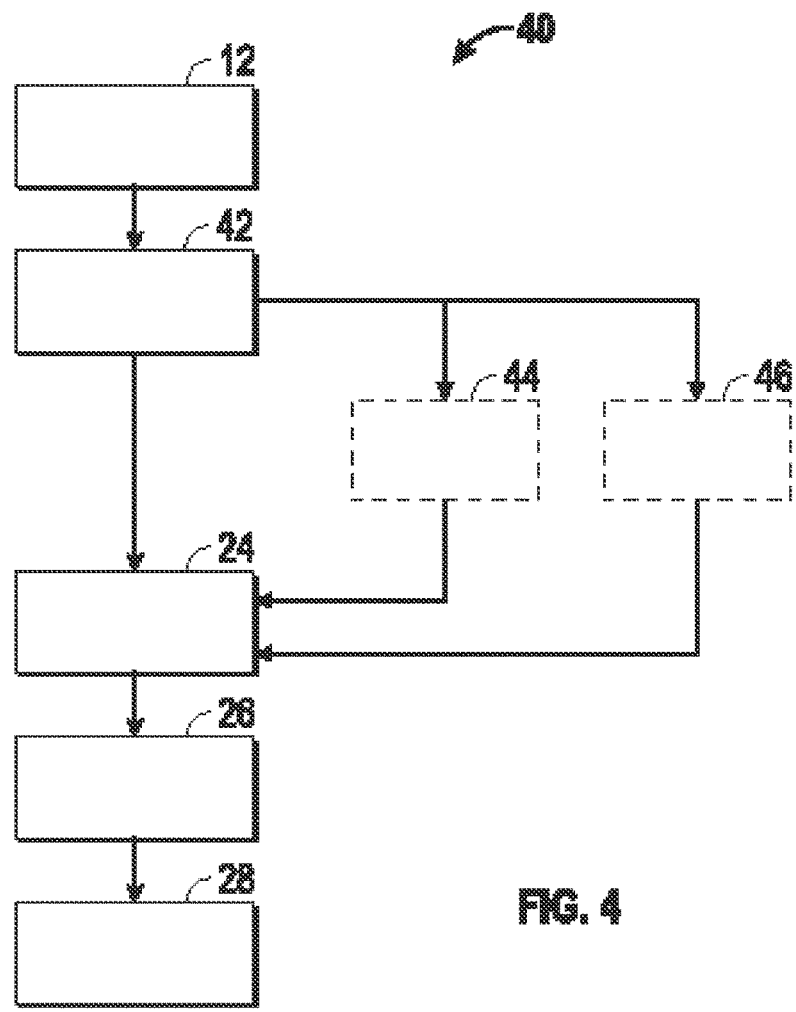
FIG. 4
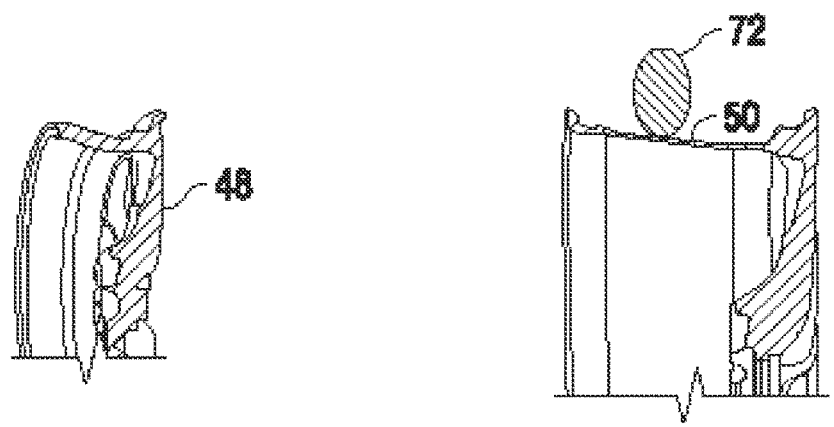
FIG. 5
FIG. 6

METHODS AND APPARATUS TO PRODUCE HIGH PERFORMANCE AXISYMMETRIC COMPONENTS

BACKGROUND OF THE INVENTION

Field of the Invention

This invention relates generally to a system, material and method for producing components such as axisymmetric components and, more particularly, to a system and method for producing high performance components that includes squeeze casting and flow-forming.

Discussion of the Related Art

When producing components such as vehicle components, it is desirable to produce one piece components, for example vehicle wheels, from a lightweight alloy in a manner that is both economical and efficient. It is also desirable to minimize the material used in low stress areas and increase the material used in high stress areas to provide a stronger component while minimizing the weight, which improves fuel efficiency.

Many high performance vehicle components, such as wheels and other axisymmetric components, are formed from a cast log or ingot, from which a billet is severed and thereafter subjected to a series of hot forging operations that form, for example, a forged blank. The wheel is then machined, subjected to flow-forming, heat treating, and finally machined a second time to create the final shape. This process is time consuming and can be costly.

Squeeze casting is a known process that includes pouring a liquid material into a mold and solidifying the liquid under pressure to create a component. However, there are size and material thickness limitations that prevent squeeze casting from creating components that meet specification requirements of high performance components.

There is a need in the art for a more cost-effective and efficient way to produce components with the desired specification requirements, particularly axisymmetric components and high performance components for vehicles.

SUMMARY OF THE INVENTION

In accordance with the teachings of the present invention, a material and method for manufacturing components is disclosed. The method includes squeeze casting the material into a component of a desired shape and flow-forming the component that has been squeeze cast to refine the shape of the component. The method also includes heat treating the component to enhance the microstructure of the component and machining the component to further refine the shape.

Additional features of the present invention will become apparent from the following description and appended claims, taken in conjunction with the accompanying drawings.

BRIEF DESCRIPTION OF THE DRAWINGS

FIG. 4 is a flow diagram of a process for manufacturing components that includes squeeze casting and flow-forming;

FIG. 5 is a cut-away, cross-sectional side view of a squeeze cast blank that will become a vehicle wheel;

FIG. 6 is a cut-away side view of a vehicle wheel formed from a squeeze cast blank;

DETAILED DESCRIPTION OF THE EMBODIMENTS

The following discussion of the embodiments of the invention directed to a method for producing components employing a squeeze casting process is merely exemplary in nature, and is in no way intended to limit the invention or its applications or uses.

Figure 1:
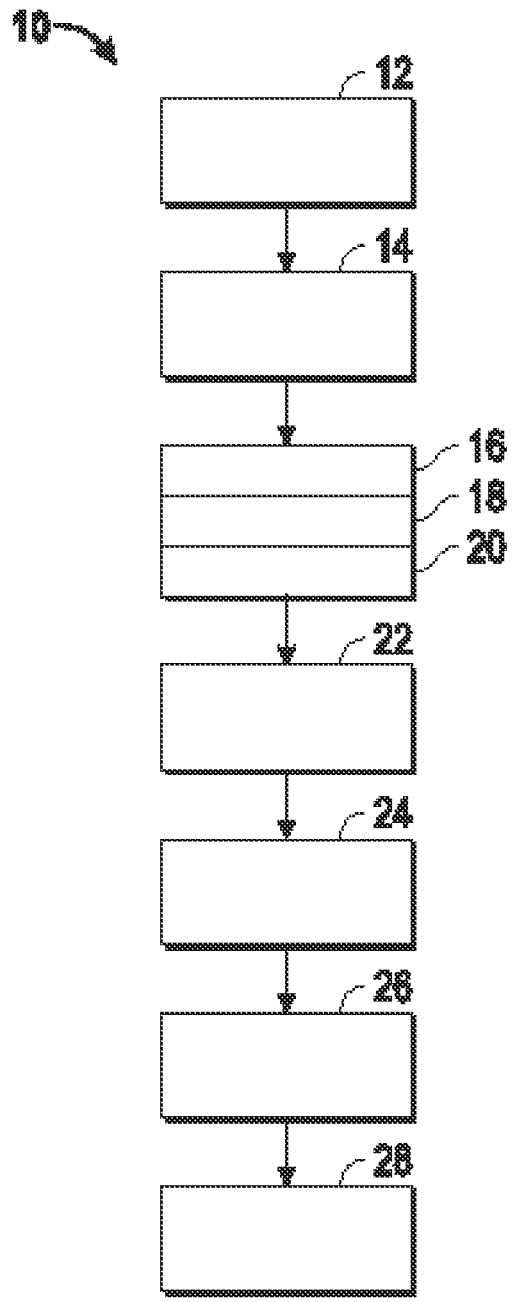
FIG. 1 is a flow diagram of a known process for manufacturing components.
Figure 2:
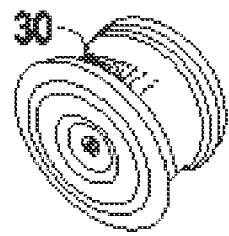
FIG. 2 is an isometric view of a forged blank that will become a vehicle wheel.
Figure 3:
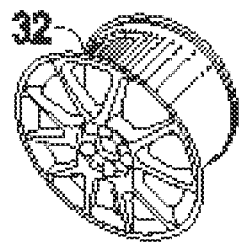
FIG. 3 is an isometric view of a vehicle wheel formed from a forged blank.

FIG. 1 is a flow diagram of one known method 10 for producing high performance components. To start, ingots are provided at box 12, which are transformed into billets at box 14. Multiple forging steps are performed at boxes 16-20, which are hot forming steps as is known to those sidled in the art. At the end of the forging steps, a forged blank 30, such as a blank that will become a vehicle wheel, is formed. For example, FIG. 2 is an isometric view of a forged blank 30 that will become a vehicle wheel. The forged blank 30 is machined a first time at box 22 to remove material to create a desired shape or design. In the example of creating the vehicle wheel, machining is performed to create wheel spokes. Next, flow-forming is performed at box 24 that includes applying force to both elongate and reduce the thickness of portions of the component being created. In the vehicle wheel example, flow-forming at the box 24 is performed on the rim portion of the forged blank 30 that is being formed into the wheel. Flow-forming may be performed at high temperature depending on the material used. A heat treatment is performed at box 26 to achieve balanced mechanical properties of the component. Thereafter, a second round of machining is performed at box 28 to achieve the final product with the final dimensions of the component and with balanced mechanical properties. FIG. 3 is an isometric view of a vehicle wheel 32 that is produced by the process discussed above.

Using multiple forging steps to create a component is time consuming and has significant costs associated therewith. Multiple forging dies are needed and the amount of starting material that is machined away to make the final product can be as much as two-thirds. For example, the forged blank 30 may be 225 kg, but ater machining the finished wheel 32 may only be 7.5 kg.

FIG. 4 is a flow diagram of a process 40 for producing high performance components that uses squeeze casting via any suitable squeeze casting apparatus known to those skilled in the art, where like reference numerals identify the same steps as in the process 10. Ingots, or a starting material, are used at the box 12, but instead of transforming the ingots into billets, the ingots are meted and poured into a casting or mold at box 42 to create a squeeze cast blank 48, shown in FIG. 5, that is the start of the shape of a component, such as a vehicle wheel 50, shown in FIG. 6. During squeeze casting, the melted ingot material is solidified under pressure to create a component with a refined microstructure that exhibits strength and ductility that is superior to components made by known methods, such as low pressure die casting. In this way, the ingots from the box 12 are squeeze cast at the box 42 such that the component being produced is quickly made to be close to the final desired shape. For example, in the case of a vehicle wheel, the wheel may be squeeze cast such that the spokes are created without the need for multiple forging steps followed by machining that cuts away a significant amount of material to create the spokes. During flow-forming at the box 24, the thick rim section of the squeeze cast blank 48 is flow-formed by a rotated roller 72 at room temperature or elevated temperatures depending on the material used to make a thin and elongated rim of the vehicle wheel 50, as shown in FIG. 6.

Figure 7:
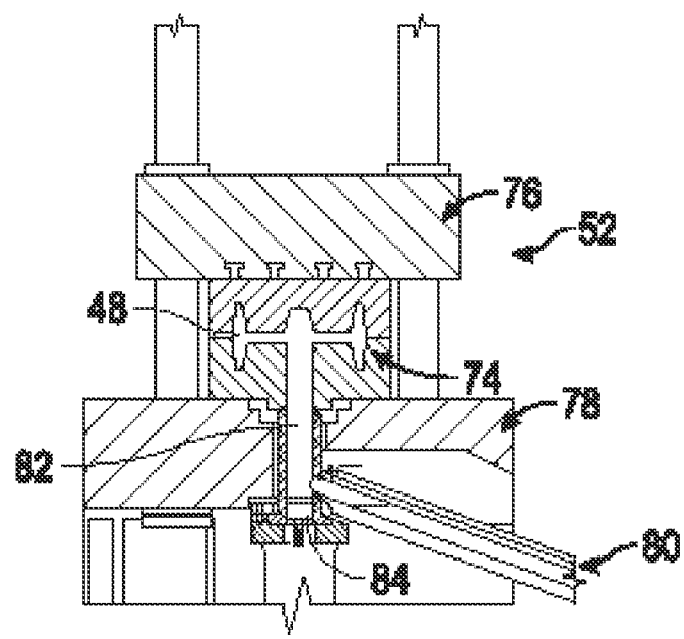
FIG. 7 is a front cross-sectional type view of an exemplary squeeze casting press.

FIG. 7 is a front cross-sectional type view of an exemplary squeeze casting press 52 that is suitable for use in the squeeze casting process at the box 42. A mold 74 is positioned between an upper platen 76 and a lower platen 78. As discussed above, the squeeze cast blank 48 is created within the mold 74. To create the squeeze cast blank 48, melted ingot material is transferred through a melt transfer 80 to a shot sleeve 82. A punch 84 moves upwards and pushes the melted ingot material into the mold 74. The punch 84 subsequently provides high squeeze pressure during solidification of the liquid, which is some predetermined time that depends on the material used and the cooing rate desired, to create the squeeze cast blank 48. After the squeeze cast blank 48 is created, the upper platen 76 and an upper portion of the mold 74 move upward such that the squeeze cast blank 48 can be removed from the mold 74. Squeeze casting molds may be of any design desired, and may be, for example, made of high strength tool steel or other metals. Typically the molds are two or more parts that can be affixed together and then taken apart when squeeze casting is complete to remove the component therein.

While squeeze casting is able to get the component being made close to its final form, additional steps such as flow-forming are required to meet specification requirements necessary for high performance components. For example, flow-forming at the box 24 is necessary for a wheel because the thickness required for the rim portion is smaller than what is achievable by squeeze casting alone. By way of example, a vehicle wheel rim portion may have a thickness requirement of 3 mm, which is not achievable by squeeze casting alone. Thus, the steps at the boxes 24-28 are used to refine the component that has been squeeze cast at the box 42 such that specification requirements may be met.

Once the cooled component, i.e., the squeeze cast blank 48, is removed from the squeeze casting mold, flow-forming is performed at the box 24 to produce the desired annular or ring shape. Additional steps may be performed prior to flow-forming, as is described in detail below. Flow-forming may be performed at room temperature. Next, heat treatment is performed at the box 26 to achieve the final product with balanced mechanic al properties. Thereafter, machining is performed at the box 28 to produce the final desired dimensions of the component being produced, such as the wheel 50. Heat treatment at the box 26 may be varied in temperature and time to suit the material being used for the component. The heat treatment typically causes particles to dissolve such that the desired particles may be precipitated out in a controlled manner, as is known to those skilled in the art.

Figure 8:
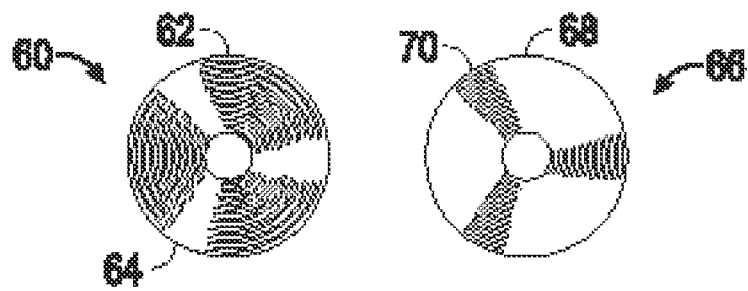
FIG. 8 illustrates front views of vehicle wheels made from a forged blank and squeeze cast blank.

FIG. 8 illustrates front views of vehicle wheels 60 and 66. The wheel 60 is made from the process 10 that includes forging. Areas 62 must be machined away to create spokes 64. The wheel 66 is made from the process 40 that includes squeeze casting, where hollow spaces 68 and spokes 70 are created by squeeze casting from the process 40 without the need for machining. The process 40 also allows for more design flexibility as well. For example, the spokes 70 that can be any shape desired.

Figure 9:
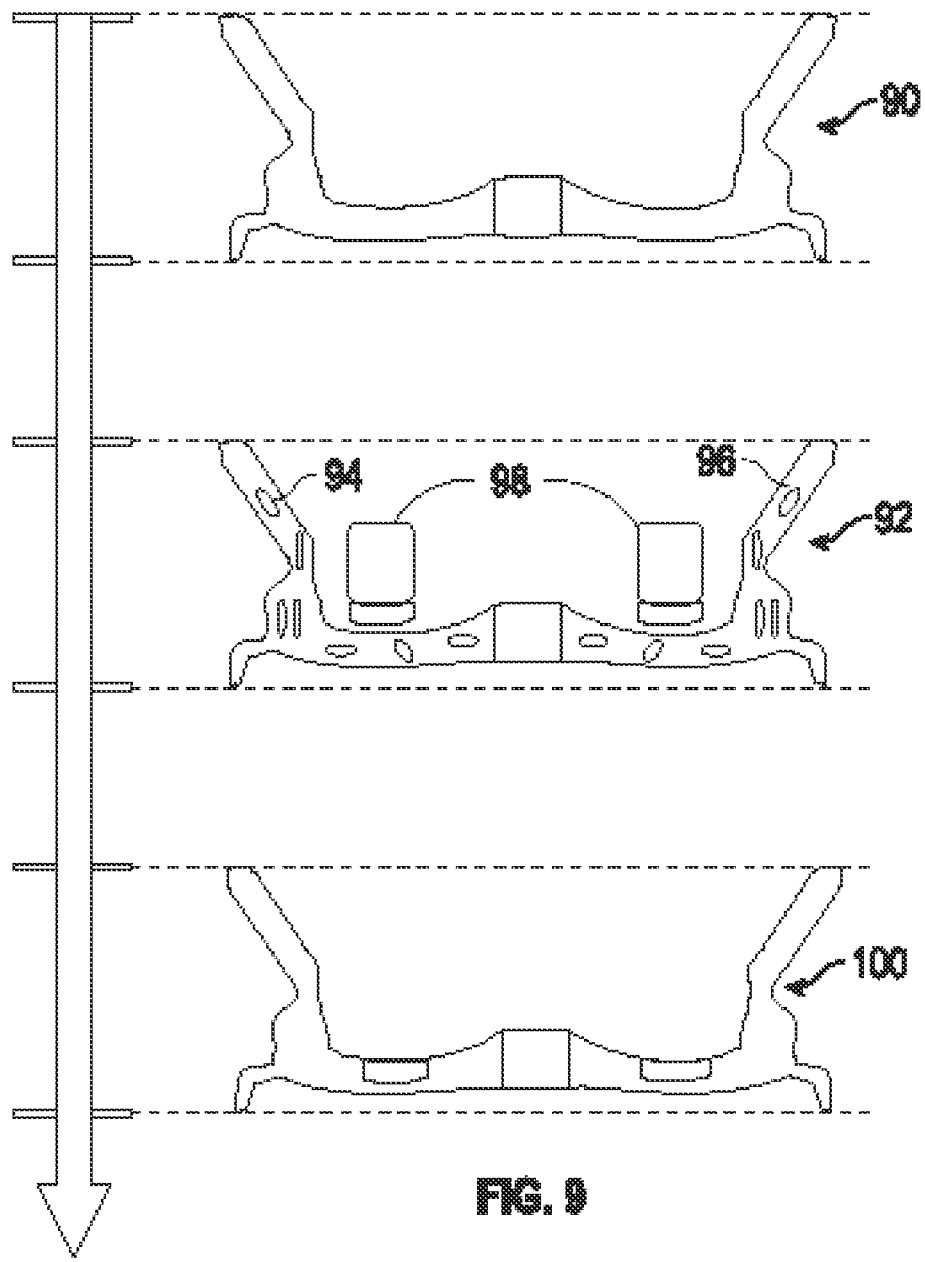
FIG. 9 is an exemplary process showing semi-solid forging.

In another embodiment, a semi-solid forging step at box 46 may be included in the process 40. Thus, ater the ingot from the box 12 has been squeeze cast at the box 42, but before the material in the mold has cooled enough to be in a completely solid state, the semi-solid forging step may be used so that the component may be manipulated when it is in a semi-solid state. FIG. 9 illustrates an exemplary semi-solid forging process. The squeeze cast component is in a liquid state 90 at high temperatures. As the temperature begins to drop over time, the component transitions to a semi-solid state 92 where there are sold portions 94 and liquid portions 96. The semi-sold forging temperature used depends on the alloy used. For example, the temperature may be 50-100 K lower than that at 100% liquid portions 96, or forging at a temperature at 40-100% volume fraction of solid portions 94 and 60-0% of liquid portions 96. One or more hammers 98, depending on the number of spokes, may be used during the semi-solid state 92 to forge the component. Thus, when a sold state 100 of the component is achieved, there will be forged portions of the component. This may be desirable for creating pockets in the spokes and/or for thinning the spokes of the component. Thus, semi-solid forging at the box 46 provides for additional design options to be created that are not possible from squeeze casting alone.

Semi-solid forging is a volume constant process, thus the process itself does not remove material. Mechanical strength of the component is increased after semi-solid forging, therefore less material is needed for the spoke portion(s) to meet required performance specifications. Furthermore, an in-die forging process may be performed at a temperature such that the material in the mold has cooled enough to be in a fully solid state. The temperature at which in-die forging is performed depends on the alloy used. For example, the temperature may be at 0-100K lower than that at 100% solid portions 94. Hot deformation is introduced into the material, thus mechanical properties are increased, which allows for less material to be used in the spokes, as stated above.

Figure 10:
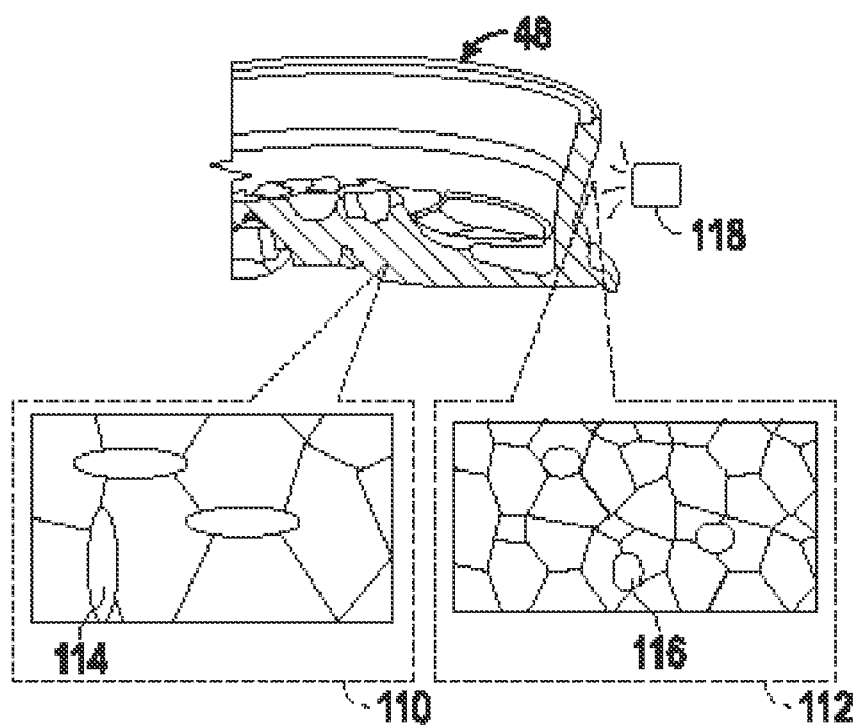
FIG. 10 is an exploded view of a microstructure of the rim portion and spoke portion of a vehicle wheel.

In another embodiment, rapid cooing of the squeeze cast component may be performed at box 44 to create a microstructure of the component that is better than what is achieved without rapid cooling. The processes of boxes 44 and 46 may be used together by cooing the component at the box 44 followed by semi-solid forging at the box 46. As shown in FIG. 10, rapid cooling of a rim portion 112 of the component illustrates a finer microstructure than spoke portion 110, which is not rapidly cooled according to this example. Elements 114 and 116 are particles that are removed during heat treatment before box 24 and re-precipitated out at the box 26, leaving an even finer microstructure. A better, or finer, microstructure is beneficial because it imparts greater strength and ductility of the component that is required for flow-forming at the box 24. Rapid cooling may be achieved by any suitable means, such as by using cooing channels 118 that are embedded within the mold and that use, for example, water or pressurized gas to rapidly cool the component or portions of the component.

The material used for the ingots of the process 40 can be any suitable alloy. In particular, special alloys of reasonable castability for squeeze casting at the box 42 may be used that provides the strength and formability required in the flow-forming step at the box 24 and provides a desired Si and Mg/Cu/Zn content. For example, a special alloy that includes a high Si content, similar to the common casting aluminum alloy A319/A356, and also a high Mg content, similar to the common wrought aluminum alloy 6082/6061 is desirable. An exemplary special alloy includes 3-6 wt. % (weight percent) of silicon to retain castability during the squeeze casting process at the box 42 and also to maximize formability for flow-forming at the box 24. A Cu+Mg+Zn content of 2-5 wt. % is also desired to make the material heat-treatable. In addition, a T4 treatment (a solution heat treatment) is desired to dissolve Cu, Mg and Zn to increase ductility to obtain a flow-formable structure, and a T5 treatment (a process of artificial aging at elevated temperature after cooing from previous hot working steps) is desired to balance strength and ductility. Further, an Fe content of 0.1-0.3 wt. % is desired to prevent die-sticking during squeeze casting, and a Cr+Mn content of 0.2-0.4 wt. % is desired to prevent the harmful β-AlFeSi phase and for better formability.

The T4 treatment described above is performed before the flow-forming step at the box 42 and the T5 treatment is performed during the heat treatment step at the box 26. The heat treatment temperature and time period depend on the specific alloy composition used. For example, a T4 temperature in the range of 673-823K for a time period of 1 to 5 hours may be used. The T5 treatment may be, for example, in the temperature range of 393-523K for a time period of 2 to 24 hours.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for manufacturing components using an alloy material, said method comprising:
   providing an alloy material that includes 3-6 wt. % Si and 2-5 wt. % Cu+Mg+Zn;
   squeeze casting the material into a component with a shape having a first thickness, wherein the material is a liquid and is poured into a mold and cooled under pressure, and wherein squeeze casting the material includes cooling the component using cooling channels in a squeeze cast mold;
   treating the component with a T4 treatment;
   flow-forming the component that has been squeeze cast to refine the shape of the component;
   heat treating the component with a T5 treatment; and
   machining the component to further refine the shape and to create a component that is in final form.

2. The method according to claim 1 wherein squeeze casting the material increases a number of boundaries in a microstructure of the component.

3. The method according to claim 1 wherein flow-forming the component elongates the component and creates an annular or ring shape with a second thickness that is less than the first thickness.

4. The method according to claim 1 further comprising a semi-solid forging process after the component has been squeeze cast and before the component has cooled to a completely solid state.

5. The method according to claim 1 further comprising performing an in-die forging process after the component has cooled to a solid state.

6. A method for manufacturing components using an alloy material, said method comprising:
   providing an alloy material that includes 3-6 wt. % Si, 2-5 wt. % Cu+Mg+Zn, 0.1-0.3 wt. % Fe, and 0.2-0.4 wt. % Cr+Mn;
   squeeze casting the material into a component with a shape having a first thickness, wherein the material is a liquid and is poured into a mold and cooled under pressure;
   treating the component with a T4 treatment;
   flow-forming the component that has been squeeze cast to refine the shape of the component;
   heat treating the component with a T5 treatment; and
   machining the component to further refine the shape and to create a component that is in final form.

7. The method according to claim 6 wherein squeeze casting the material increases a number of boundaries in a microstructure of the component.

8. The method according to claim 6 wherein flow-forming the component elongates the component and creates an annular or ring shape with a second thickness that is less than the first thickness.

9. The method according to claim 6 further comprising a semi-solid forging process after the component has been squeeze cast and before the component has cooled to a completely solid state.

10. The method according to claim 6 further comprising performing an in-die forging process after the component has cooled to a solid state.

* * * * *